United States Patent [19]

Hirata et al.

[11] 3,919,140

[45] Nov. 11, 1975

[54] PROCESS FOR PRODUCING ACRYLAMIDE POLYMERS IN AN ACETONE-WATER SOLVENT SYSTEM

[75] Inventors: Hidekazu Hirata, Toyonaka; Siro Sakai, Higashiosaka, both of Japan

[73] Assignee: Sumitomo Chemical Company, Limited, Osaka, Japan

[22] Filed: Dec. 27, 1974

[21] Appl. No.: 536,865

Related U.S. Application Data

[63] Continuation-in-part of Ser. No. 285,117, Aug. 31, 1972, abandoned.

[52] U.S. Cl. 260/17 A; 260/29.6 WB; 260/29.6 H; 260/29.6 SQ; 260/29.6 HN; 260/32.8 N; 260/79.3 M; 260/80.3 N; 260/85.5 AM; 260/85.5 N; 260/86.1 N; 260/89.7 R; 260/875
[51] Int. Cl.² C08L 1/10; C08F 120/52; C08L 51/00
[58] Field of Search 260/17 A, 79.3 M, 80.3 N, 260/85.5 AM, 85.5 N, 86.1 N, 328 N, 89.7 R, 875

[56] References Cited
UNITED STATES PATENTS
3,301,809    1/1967    Goldberg et al............ 260/29.6 WB
3,509,113    4/1970    Monagle et al.............. 260/80.3 N

OTHER PUBLICATIONS

Schildknecht, Polymer Processes, Interscience Publishers, pp. 71–79, 1956.
Davidson et al., Water-Soluble Resins, Rheinhold Book Corp., pp. 121–122, 1968.

*Primary Examiner*—Richard B. Turer
*Attorney, Agent, or Firm*—Stewart and Kolasch, Ltd.

[57] ABSTRACT

A process for producing acrylamide polymers involves polymerization of acrylamide or methacrylamide or polymerizable monovinylic monomers containing predominantly acrylamide or methacrylamide in a mixture of acetone and water in the presence of polyvinyl alcohol, the amount of acetone being from about 23 to 30 %, preferably up to 29.5 %, by weight based on the weight of the acetone-water mixture and the amount of polyvinyl alcohol being from 0.5 to 4 % by weight based on the weight of the polymerizable monomers. The water-soluble acrylamide polymers obtained by this process are in the form of a powder and possess high intrinsic viscosity or high molecular weight so that they are useful as flocculating agents.

19 Claims, No Drawings

PROCESS FOR PRODUCING ACRYLAMIDE POLYMERS IN AN ACETONE-WATER SOLVENT SYSTEM

This application is a continuation-in-part application of our copending application Ser. No. 285,117, filed Aug. 31, 1972 now abandoned.

The present invention relates to a process for producing acrylamide polymers. More particularly, it relates to an improved process for the production of water-soluble polymers of acrylamide or methacrylamide or polymerizable monovinylic monomers containing predominantly acrylamide or methacrylamide, which are in the form of a powder and possess high intrinsic viscosity and/or high molecular weight.

Acrylamide polymers are useful as sizing agents, thickeners, binders, painting agents, dispersing agents, and the like. Particularly, polyacrylamides of high intrinsic viscosity and/or high molecular weight are useful as flocculating agents.

Various processes for the production of such acrylamide polymers have hithertofore been proposed. Of these, the radical polymerization has extensively been employed in the chemical industry, where a radical initiator or a redox catalyst system is employed in an aqueous phase or in an organic phase in which the monomer component or components for the acrylamide polymer are soluble, but the resulting polyacrylamides are insoluble.

Where the polymerization is effected in an organic phase, i.e., precipitation polymerization, however, it is very difficult to yield a polyacrylamide with a high degree of polymerization because of its remarkable chain transferring property. Accordingly, this precipitation polymerization may not be applied to the production of acrylamide polymers possessing high intrinsic viscosity and/or high molecular weight.

On the other hand, the polymerization which is effected in an aqueous phase, namely, solution polymerization, can yield a polyacrylamide having a high degree of polymerization with ease so that this reaction is suited for the production of an acrylamide polymer of high intrinsic viscosity and/or high molecular weight. However, this solution polymerization, when the monomer component or components are employed in a high concentration, generates a great amount of heat and it becomes difficult to control the reaction conditions at an appropriate level. Furthermore, the resulting acrylamide polymers having a high degree of polymerization makes the reaction system so viscous that the agitation or treatment of the reaction system may not readily be performed. Moreover, if heat generated during the course of the solution polymerization could not effectively be eliminated from the reaction system, the polymerization reaction would take place on the amide group of the monomer or monomers, resulting in the formation of water-insoluble polymers. This water-insoluble polymer is useless for the purpose of flocculation.

In order to avoid such disadvantages said conventional solution polymerization possesses, a process has been proposed where the monomer or monomers are employed in a low concentration, e.g., 10 per cent or less. However, this process requires a large amount of a water-miscible organic solvent such as methanol to precipitate the resulting polyacrylamide as a slurry because the concentration thereof is very low in a solution where the reaction is carried out. However, the use of a large amount of such a water-miscible organic solvent is disadvantageous from the point of view of the industrial economy.

As other processes, suspension and emulsion polymerizations are known. These polymerization reactions are carried out in an O/W or W/O type dispersion by the use of an appropriate organic solvent such as n-heptane, carbon tetrachloride, toluene, or xylene, and a surfactant. In this case, however, the dispersion is not satisfactory in stability and requires an extensive care to be taken because of its inflammable property. These reactions also requires the use of a large amount of an organic solvent for precipitation of the polymer. These factors prevent the suspension and emulsion polymerization from being adopted on an industrial scale.

It is also known from U.S. Pat. No. 3,509,113 that a precipitation polymerization is carried out using acetone in a reaction system. It is disclosed in this patent that the polymerization of acrylamide or polymerizable monovinylic monomers containing predominantly acrylamide is effected in the presence of acetone in an amount ranging from 30 to 70 per cent by weight based on the combined weight of acetone and water, thereby causing precipitation of the resulting polyacrylamide as a slurry. However, this modified precipitation polymerization has also been found to be unfavorable because the acrylamide polymer flocculates to each other, resulting in the formation of a polymer particle having a large size, e.g., the size of rice grains. This phenomenon may cause a considerable decrease in yields of the polymer product. Furthermore, the polymer thus obtained tends to become so adhesive and sticky on filtration and shows so remarkable sintering on drying that it will take a long time to yield a commercial product from the slurry. Although said U.S. Pat. No. 3,509,113 suggests that addition of an inorganic salt, e.g., potassium chloride, sodium chloride or ammonium sulfate, and/or a buffering agent, e.g., ammonium chloride-ammonia water, to the reaction system may solve the troubles caused by the sticky property of the resulting polymer, a satisfactory result may hardly be obtained because, for instance, several tens of percent of the produced polyacrylamide adheres to the wall of a reaction vessel even when the addition of said material is made.

It has been found that the disadvantages and difficulties said conventional methods present are to be overcome by polymerizing acrylamide or methacrylamide or polymerizable monovinylic monomers containing predominantly acrylamide or methacrylamide in a mixture of acetone and water in the presence of polyvinyl alcohol, the amount of acetone being from about 23 to 30%, preferably up to 29.5%, by weight based on the weight of the acetone-water mixture. This polymerization can provide a water-soluble acrylamide polymer which is in the form of a powder or granule and possess a high intrinsic viscosity and high molecular weight.

The polymerization of the present invention in which the acetone is used in an amount of from about 23 to 30%, preferably up to 29.5%, by weight based on the combined weight of acetone and water, together with polyvinyl alcohol, can provide a polyacrylamide which is less adhesive and sticky, thereby obviating the disadvantages involved in the polyacrylamide obtained by said conventional polymerization reactions. If the concentration of acetone is lower than the lower limit, the reaction system becomes highly viscous and sticky and may bring about the so-called "Weissenberg effect", resulting in the formation of a gel. If the amount thereof is greater than the upper limit, the adhesiveness and stickiness of the produced acrylamide polymer is caused to increase to such an extent that they agglomerate into rubber-like materials and flocculated to each other, thereby resulting in adherence to the wall of a reaction vessel where the polymerization takes place.

In order to avoid flocculating the acrylamide polymer at the stage of polymerization, the employment of polyvinyl alcohol is also critical, as well as the use of a mixture of acetone and water containing acetone in the amount as described above. For this purpose, the amount of polyvinyl alcohol to be used may be from about 0.5 to about 4%, preferably from about 1.0 to 2%, by weight based on the weight of the polymerizable monomers.

The polymerizable monomer to be used in the present invention is acrylamide or methacrylamide or polymerizable monovinylic monomer containing predominantly acrylamide or methacrylamide. By the term "predominantly" is meant that the amount of acrylamide or methacrylamide in the monovinylic monomers is not less than 50% by weight. In this specification, acrylamide, or methacrylamide will hereinafter be referred to as "predominant monomer" and the other monomer which is contained in the polymerizable monovinylic monomers referred to as "optional monomer".

As the optional monomer, there may be employed a monomer which is soluble in a mixture of acetone and water and whose copolymer with the predominant monomer is insoluble or hardly soluble in said acetone-water mixture. The optional monomer includes, for example, (1) acrylonitrile, (2) an anionic monomer, e.g., acrylic acid, methacrylic acid or their metal or ammonium salts, sodium vinylsulfonate or sulfonated styrene, or (3) a basic monomer which becomes cationic when quaternized, e.g., vinylpyridine or dialkylaminoalkyl methacrylate. The optional monomers as specifically described above are particularly useful for providing the resulting polymer with an anionic or cationic property and/or a higher water solubility.

The concentration of the monomeric component or components in the reaction system may usually be from about 10 to about 30%, preferably from about 15 to about 25%, by weight, based on the total weight of the polymerization reaction mixture.

The polymerization reaction of the present invention may be carried out in the presence of a catalyst. The catalyst to be used for this purpose may be any catalyst which is soluble in a mixture of acetone and water and which can also afford a radical upon decomposition. The catalyst includes, for example, particularly a water-soluble peroxide, e.g., hydrogen peroxide, potassium persulfate or ammonium persulfate, and azobisisobutyronitrile. A redox catalyst system such as potassium persulfate and sodium hydrogen sulfite, an amine or sodium formaldehyde sulfoxylate may also be used. The amount of the catalyst may usually be from about 0.01 to 0.2% by weight based on the weight of the monomeric component or components.

A dispersion stabilizer may also be added to the reaction system if necessary. Illustrative examples of the dispersion stabilizers are water-soluble high molecular weight compound, e.g., carboxymethyl cellulose, inorganic salts, e.g., potassium chloride, sodium chloride, ammonium chloride, sodium sulfate or sodium carbonate, and buffering agents, e.g., sodium acetate-acetic acid or ammonium chloride-ammonia water.

The polymerization of the present invention may be effected in a per se known manner. The reaction temperature is preferably from about 20° to about 60° C.

The process of the present invention can provide an acrylamide or methacrylamide polymer whose particles are hardly adhesive and sticky so that no undesired "build-up" of the polymer is caused in a reaction vessel where the polymerization takes place. This polymer is obtainable as a slurry. The slurry may be separated by a conventional filtration procedure, if necessary, after being washed with acetone in the reaction vessel, and the polymer collected by filtration may then be dried to give fine granules of uniform particle size. The polymer thus obtained can readily and sufficiently be dissolved in cold water with stirring. The granules may optionally be ground into a desired size prior to practical use.

The intrinsic viscosity [$\eta$] of the polymer of the present invention is usually 10 or more when determined at 30° C. in a 1 N sodium nitrate solution. The polymer of rice grain size obtained by the precipitation polymerization in which a mixture of acetone and water is employed in an amount greter than the upper limit on the acetone concentration for the polymerization of the present invention, but polyvinyl alcohol is not employed, shows an intrinsic viscosity lower than that of the polymer of the present invention.

The slurry produced by the process of the present invention is in the form of fine particles and provides an excellent stability so that it may be subjected, for instance, to a reaction with a monoaldehyde and an amine without isolating the polymer from the reaction mixture.

From the above, the process of the present invention is advantageous in that the starting monomeric component or components may be used in a high concentration and the polymer of a high molecular weight exceeding about 3,000,000 can readily be obtained in the form of a powder or granule. It is also advantageous that the solvent for the reaction system is a mixture containing acetone and water in a low concentration, the both solvents being relatively inexpensive.

The following examples illustrate the present invention without, however, limiting the same thereto.

EXAMPLE 1

A solution of acrylamide (190 g.) and acrylic acid (10 g.) in a mixture of water (505 g.) and acetone (236 g.) is neutralized with a 30% sodium hydroxide aqeuous solution (about 22 ml.) followed by addition thereto of a 10% aqueous solution (20 g.) of polyvinyl alcohol (trade name: "Gosenol GH-17"). After the atmosphere is completely replaced by nitrogen, a 1% aqueous solution (10 ml.) of potassium persulfate and a 1% aqueous solution (5 ml.) of sodium hydrogen sulfite are added thereto, whereby a transparent, uniform solution is obtained. The reaction starts a few minutes after the addition thereof and the reaction mixture becomes white and turbid as the reaction proceeds. The polymerization is carried out at 40° C. with stirring in a nitrogen stream for 4 hours, during which no build-up of the polymer in the reaction vessel is observed. The resulting slurry is separated by filtration, and the powdery polymer is washed with acetone and dried under reduced pressure to give white particles of the polymer. Yield: 198 g. Its intrinsic viscosity was found to be 12.1 when determined at 30° C. in a 1 N sodium nitrate solution.

the concentration of acetone in the reaction medium is 29.5% by weight.

EXAMPLE 2

Acrylic acid (29 g.) is dissolved in water (200 g.) with stirring, and the solution is neutralized with a 10 N sodium hydroxide aqueous solution (about 40 ml.) at a temperature lower than 35°C. After addition thereto of acrylamide (162 g.), water (313 g.) and acetone (220 g.), a 10% aqueous solution (20 g.) of polyvinyl alcohol (trade name: "Gosenol GH-17") is added to the stirred mixture, and the atmosphere in the reaction vessel is completely replaced by nitrogen. The addition of a 1% aqueous solution (5 ml.) of potassium persulfate and a 1% aqueous solution (2 ml.) of sodium formaldehyde sulfoxylate (trade name: "Redole CP") gives a transparent, uniform solution.

The reaction starts within a few minutes thereafter and the reaction mixture turns white and turbid as the reaction proceeds. The polymerization is carried out at 25°C. for 4 hours. The produced slurry is stable, and no undesirable build-up of the polymer in the reaction vessel is observed. The polymer thus obtained is collected by filtration and worked up as in Example 1 to give white particles of the polymer with a yield of about 90%. This acrylamide polymer is found to be soluble in water well and have an intrinsic viscosity of 17.2.

The concentration of acetone is 27.5% by weight based on the weight of the acetone-water mixture.

EXAMPLE 3

The polymerization is carried out using acrylamide containing 35 mole per cent of sodium acrylate in a mixture of acetone and water (acetone concentration: 23% by weight) at 40° to 45°C. in the same manner as in Example 2. The resulting slurry is uniform and stable with no scale sticking observed. The reaction mixture is admixed with acetone and then filtered. The product thus obtained is then dried at 60°C. under reduced pressure for 6 hours to give a white powder. Yield: 99%.

The polymer (1.0 g.) thus obtained is added to water (99.0 g.) with stirring at room temperature, whereby a transparent solution is obtained in 11 minutes without forming a curd. The viscosity of a 1% aqueous solution of the resulting polymer is found to be 1,760 c.p. at 25°C.

EXAMPLE 4

A solution of acrylamide (140 g.) and acrylic acid (60 g.) in water (450 g.) is neutralized with a 10 N sodium hydroxide aqueous solution (110 g.) followed by addition thereto of a 5% aqueous solution (40 g.) of polyvinyl alcohol and acetone (200 g.). The concentration of acetone is 25.2% by weight. After the atmosphere in the reaction vessel is completely replaced by nitrogen, potassium persulfate (0.1 g.) and tetramethylethylenediamine (0.2 g.) are added. The polymerization is carried out at 20°C. for 6 hours. The resulting slurry is stable and the product collected by filtration. The product is then worked up in the same manner as in Example 1 to give white particles of the polymer with a yield of 210 g. Its intrinsic viscosity is found to be 16.5.

EXAMPLE 5

A mixture of 70% of acrylamide and 30% of acrylic acid is polymerized in the same manner as in Example 3 in which the amount of acetone is 23% by weight based on the weight of the acetone-water mixture and a catalyst system is a combination of potassium persulfate and tetramethylethylenediamine.

The resulting polyacrylamide shows an intrinsic viscosity of 18.0 and a viscosity of 1,760 cps at 25°C.

It is also found that the amount of the polymer stuck to a reaction vessel is as little as about 2% based on the yield of the polymer.

COMPARATIVE EXAMPLE 1

A mixture of 70% of acrylamide and 30% of acrylic acid in a concentration of 25% by weight of the total polymerization reaction mixture is polymerized at a temperature of 40°C. in a mixture of acetone and water containing acetone in the amount of 40% by weight based on the weight of the acetone-water mixture. A catalyst system used herein comprises 0.10% by weight of potassium persulfate as an initiator and 0.20% by weight of tetramethylethylenediamine as an activator.

The resulting polyacrylamide shows an intrinsic viscosity of 10.3. The amount of the polymer stuck to the reaction vessel is found to be about 20% by weight based on the total amount of the product.

COMPARATIVE EXAMPLE 2

Example 3 is repeated using the same procedures and compounds except for no use of polyvinyl alcohol. The amount of polyacrylamide stuck to the wall of the reaction vessel is found to be almost the same as in Comparative Example 1.

COMPARATIVE EXAMPLE 3

The procedure of Example 3 was repeated using the same reaction conditions and reagents except for the use of acetone in the amount of 35.5% by weight, the amount being higher than the upper limit of the acetone concentration in the process of the present invention.

The amount of the polymer stuck to the reaction vessel is found to be almost the same as in Comparative Example 1.

COMPARATIVE EXAMPLE 4

The procedure of Comparative Example 1 is repeated by polymerizing 85% of acrylamide and 15% of sodium acrylate at a temperature of 50°C. in an acetone-water mixture containing acetone in the amount of 15% by weight over a catalyst system comprising potassium persulfate and tetramethylethylenediamine.

The acrylamide polymer is found to show an intrinsic viscosity of 15. The amount of the polymer stuck to the reaction vessel is found to be 15% by weight based on the yield thereof.

EXAMPLE 6

The procedure of Example 4 is repeated except that the monomers, i.e., acrylamide and acrylic acid, are employed in variouss proportions as described in a table below, the concentration of the monomers is 20% by weight based on the weight of the total polymerization reaction mixture, and the polymerization is carried out for 6 hours at 20°C.

The acetone concentration in the acetone-water mixture used herein is 29.5% by weight based thereon.

COMPARATIVE EXAMPLE 5

The procedure of Example 6 is repeated except for the use of acetone in the amount of 31.0% by weight instead of 29.5% by weight.

| Monomers | Acetone conc'n. % by wt. | Yield, % | Intrinsic viscosity, $[\eta]$ | Amount of polymer stuck, % |
|---|---|---|---|---|
| 85% AM$^a$ +15% AA$^b$ | 29.5 | 95 | 16.0 | 2 |
| 85% AM + 15% AA | 31.0 | 92 | 15.4 | 30 |
| 90% AM + 10% AA | 29.5 | 96 | 14.8 | 2 |
| 90% AM + 10% AA | 31.0 | 95 | 14.0 | 20 |
| 95% AM + 5% AA | 29.5 | 98 | 14.5 | 2 |
| 95% AM + 5% AA | 31.0 | 98 | 14.0 | 20 |

AM$^a$: acrylamide
AA$^b$: acrylic acid

What we claim is:

1. A process for producing acrylamide polymers which comprises conducting the polymerization of acrylamide or methacrylamide or polymerizable monovinylic monomers containing predominantly acrylamide or methacrylamide in a mixture of acetone and water in the presence of polyvinyl alcohol, the amount of acetone being from 23 to 29.5% by weight based on the weight of the acetone-water mixture and the amount of polyvinyl alcohol being from 0.5 to 4% by weight based on the weight of the polymerizable monomers.

2. The process according to claim 1, wherein the concentration of the polymerizable monomers is from 10 to 30% by weight based on the total weight of the polymerization reaction mixture.

3. The process according to claim 2, wherein the concentration of the polymerizable monomers is from 15 to 25% by weight.

4. The process according to claim 1, wherein the amount of polyvinyl alcohol is from 1 to 2% by weight based on the weight of the polymerizable monomers.

5. The process according to claim 1, wherein the polymerizable monovinylic monomers other than acrylamide and methacrylamide is a member or a combination of members selected from the group consisting of acrylonitrile, an anionic monomer and a basic monomer which become cationic when quaternized.

6. The process according to claim 5, wherein the anionic monomer is acrylic acid, methacrylic acid or their metal or ammonium salt, sodium vinylsulfonate or sulfonated styrene.

7. The process according to claim 5, wherein the basic monomer is vinylpyridine or dialkylaminoalkyl methacrylate.

8. The process according to claim 1, wherein a catalyst which is soluble in a mixture of acetone and water is used.

9. The process according to claim 8, wherein the catalyst is a radical catalyst or a redox catalyst.

10. The process according to claim 9, wherein the radical catalyst is a water-soluble peroxide and azobisisobutyronitrile.

11. The process according to claim 10, wherein the water-soluble peroxide is hydrogen peroxide, potassium persulfate or ammonium persulfate.

12. The process according to claim 9, wherein the redox catalyst is potassium persulfate and sodium hydrogen sulfite, an amine or sodium formaldehyde sulfoxylate.

13. The process according to claim 8, wherein the catalyst is used in an amount of from 0.01 to 0.2% by weight based on the weight of the monomeric component or components.

14. The process according to claim 1, wherein a dispersion stabilizer is present in the reaction system.

15. The process according to claim 14, wherein the dispersion stabilizer is a water-soluble high molecular weight compound, an inorganic salt or a buffering agent.

16. The process according to claim 15, wherein the water-soluble high molecular weight compound is carboxymethyl cellulose.

17. The process according to claim 15, wherein the inorganic salt is potassium chloride, sodium chloride, ammonium chloride, sodium sulfate or sodium carbonate.

18. The process according to claim 15, wherein the buffering agent is sodium acetate-acetic acid or ammonium chloride-ammonia water.

19. The process according to claim 1, wherein the reaction temperature is from 20° to 30° C.

* * * * *